US012521767B2

(12) United States Patent
Itoh

(10) Patent No.: US 12,521,767 B2
(45) Date of Patent: Jan. 13, 2026

(54) SORTING APPARATUS AND SORTING METHOD

(71) Applicant: Aoi Seiki Co., Ltd., Kumamoto (JP)

(72) Inventor: Teruaki Itoh, Kumamoto (JP)

(73) Assignee: AOI SEIKI CO., LTD., Kumamoto (JP)

( * ) Notice: Subject to any disclaimer, the term of this patent is extended or adjusted under 35 U.S.C. 154(b) by 0 days.

(21) Appl. No.: 18/649,085

(22) Filed: Apr. 29, 2024

(65) Prior Publication Data

US 2024/0375153 A1 Nov. 14, 2024

(30) Foreign Application Priority Data

May 11, 2023 (JP) ................................ 2023-078713

(51) Int. Cl.
*B07C 5/36* (2006.01)
*B07C 5/34* (2006.01)

(52) U.S. Cl.
CPC ................ *B07C 5/361* (2013.01); *B07C 5/34* (2013.01)

(58) Field of Classification Search
CPC ........... B07C 5/361; B07C 5/34; B65G 47/48; B65G 47/71; B65G 47/82; B65G 47/91; B65G 47/902
USPC ........................................................ 209/523
See application file for complete search history.

(56) References Cited

U.S. PATENT DOCUMENTS

| | | | | |
|---|---|---|---|---|
| 10,246,258 | B2 * | 4/2019 | Lisso | B65G 47/90 |
| 2004/0267403 | A1 * | 12/2004 | Itoh | G01N 35/04 700/214 |
| 2018/0105363 | A1 | 4/2018 | Lisso et al. | |
| 2022/0011294 | A1 * | 1/2022 | Itoh | G06T 7/0012 |

FOREIGN PATENT DOCUMENTS

| | | | |
|---|---|---|---|
| CA | 3 040 954 | | 10/2019 |
| CN | 112 193 822 | A | 1/2021 |
| CN | 112193882 | A | 1/2021 |
| CN | 114 769 133 | A | 7/2022 |
| CN | 114769113 | A | 7/2022 |
| JP | 2017-120206 | A | 7/2017 |

OTHER PUBLICATIONS

European Search Report issued Oct. 11, 2024 in connection with European Patent Application No. EP 24172906.0.
European search report dated Oct. 11, 2024 in connection with corresponding European Patent Application No. 24 17 2906.
Office Action dated Oct. 28, 2025, issued in connection with Canadian Patent Application No. 3,237,195.

* cited by examiner

*Primary Examiner* — Michael Mccullough
*Assistant Examiner* — Jessica L Burkman
(74) *Attorney, Agent, or Firm* — John P. White

(57) ABSTRACT

According to an aspect of the invention, a sorting apparatus comprises; a holder station in which a plurality of holders each configured to hold a specimen container in an upright state are disposed; a sort conveyance unit including a plurality of sort conveyance paths configured to convey the holders; a transfer unit including a plurality of transfer arms, each configured to hold one of the holders and transfer the holder to any one of the sort conveyance paths; and a control unit configured to control a transfer destination of the holder in the transfer unit.

11 Claims, 19 Drawing Sheets

SORTING APPARATUS AND SORTING METHOD

CROSS-REFERENCE TO RELATED APPLICATION(S)

This application is based upon and claims the benefit of priority from the prior Japanese Patent Application No. 2023-078713, filed May 11, 2023 the entire contents of which are incorporated herein by reference.

FIELD

The present invention relates generally to a sorting apparatus and a sorting method for specimen containers.

BACKGROUND

A sorting apparatus is known, which discriminates specimen containers, for example, blood collecting tubes capable of containing specimens such as blood, and sorts them to a plurality of conveyance destinations. For example, a method is known in which conveyors for conveying holders that hold specimen containers in an upright state through a plurality of lanes are arranged in parallel, and lane change is sequentially performed to convey holders to designated conveyors based on specimen conveyance information. In such a configuration, it is necessary to determine whether a specimen container should go straight or whether a lane change should be carried out in one sorting lane for one specimen container. For example, to sort the specimen container to a conveyor separated by ten lanes, the lane change must be carried out ten times. Therefore, a large space is required for a lane change mechanism. A processing time for the specimen container to reach a desired conveyor is also required. In addition, a merging process or the like at a sorting destination should also be taken into consideration. Therefore, the conveyor configuration is very complicated (for example, Jpn. Pat. Appln. KOKAI Publication No. 2017-120206).

SUMMARY

According to an aspect of the invention, a sorting apparatus comprises; a holder station in which a plurality of holders each configured to hold a specimen container in an upright state are disposed; a sort conveyance unit including a plurality of sort conveyance paths configured to convey the holders; a transfer unit including a plurality of transfer arms, each configured to hold one of the holders and transfer the holder to any one of the sort conveyance paths; and a control unit configured to control a transfer destination of the holder in the transfer unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DETAILED DESCRIPTION

Figure 1:
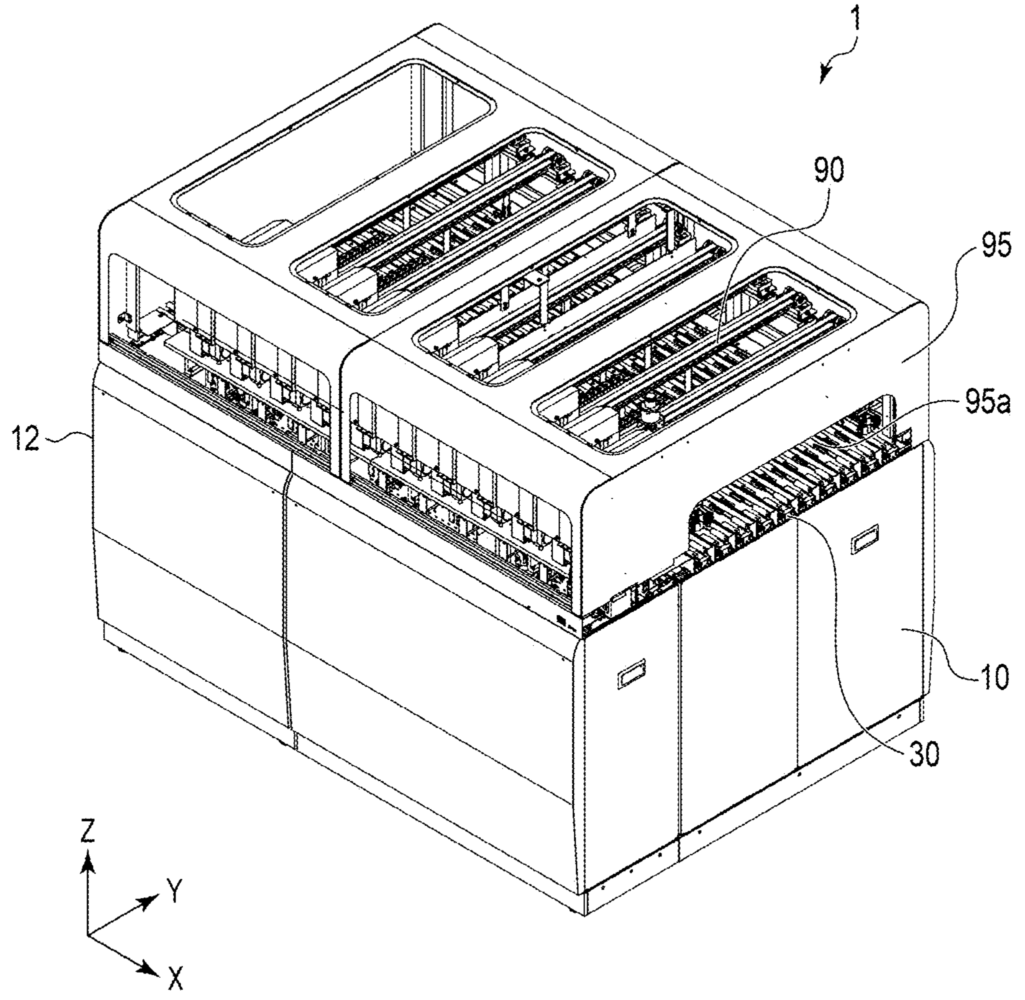
FIG. 1 is a perspective view of a sorting apparatus according to a first embodiment of the present invention.
Figure 2:
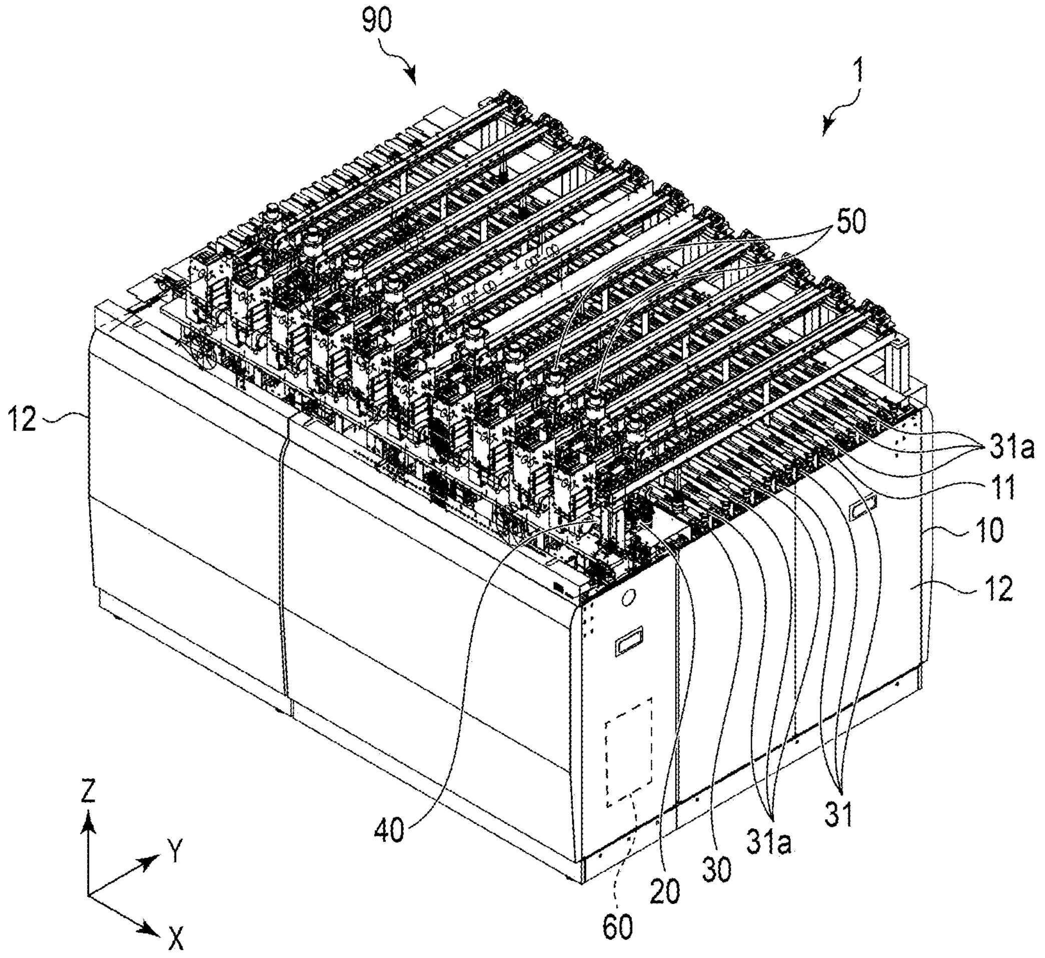
FIG. 2 is a perspective view showing a configuration of an inside of a cover of the sorting apparatus.
Figure 3:
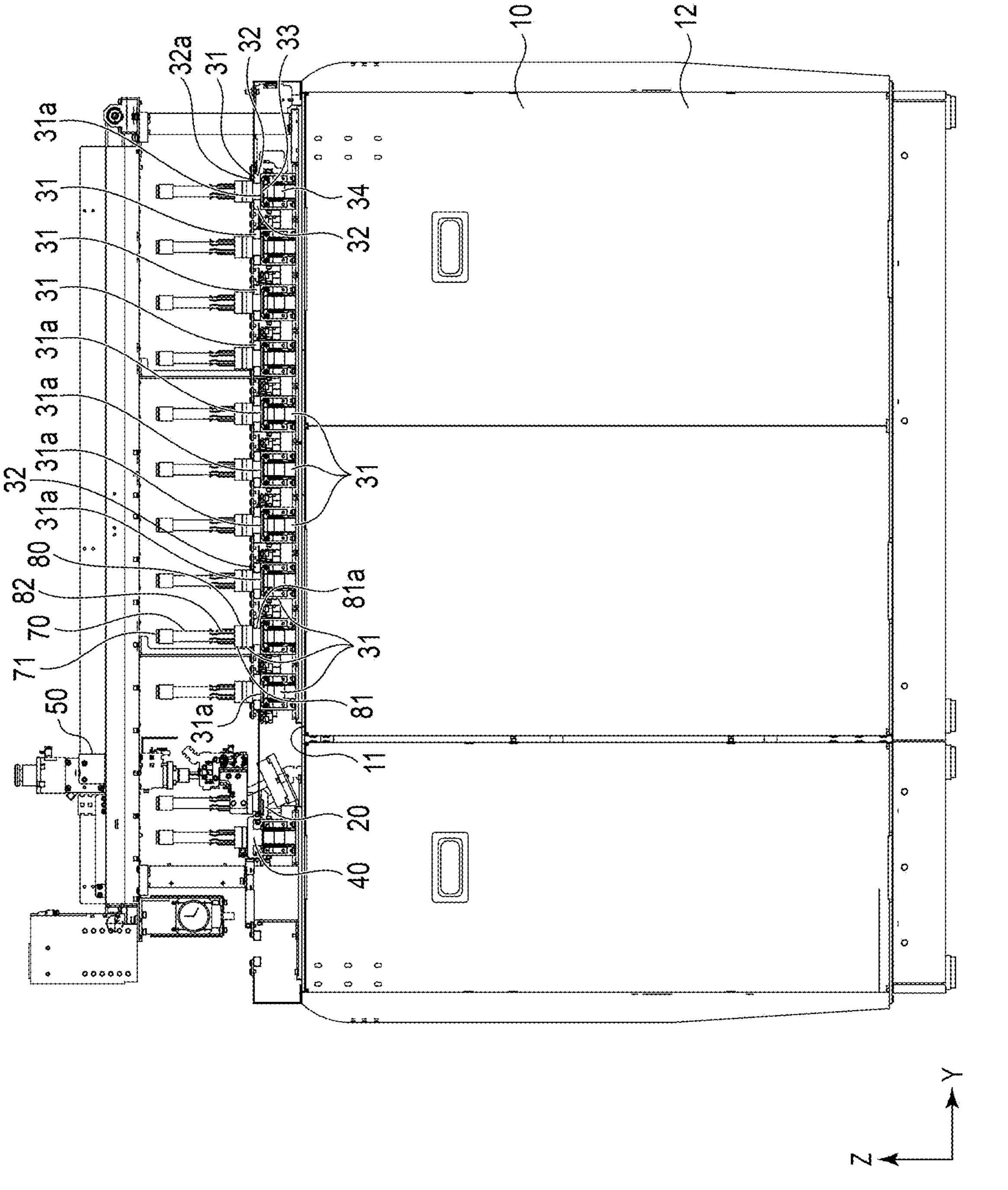
FIG. 3 is a front view of the sorting apparatus.
Figure 4:
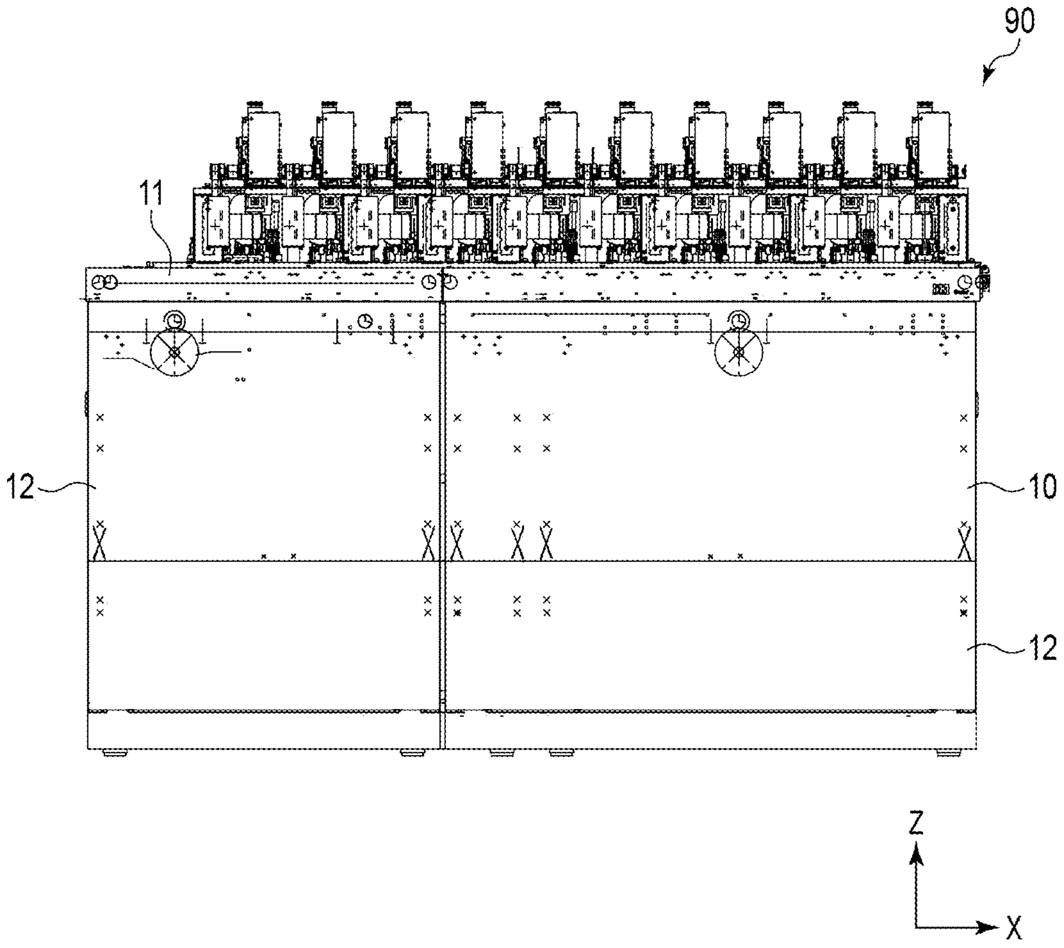
FIG. 4 is a side view of the sorting apparatus.
Figure 5:
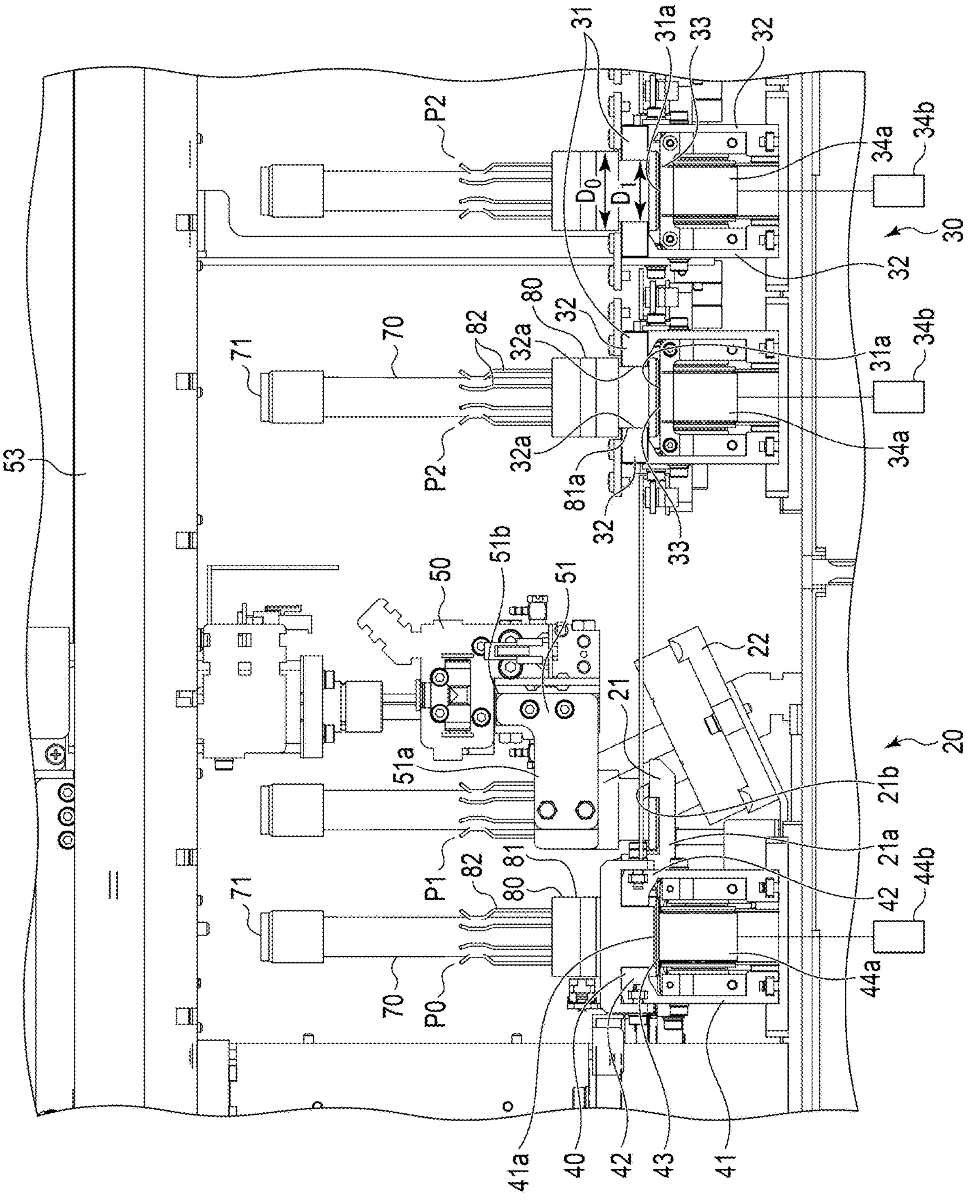
FIG. 5 is a side view showing a part of the sorting apparatus.
Figure 6:
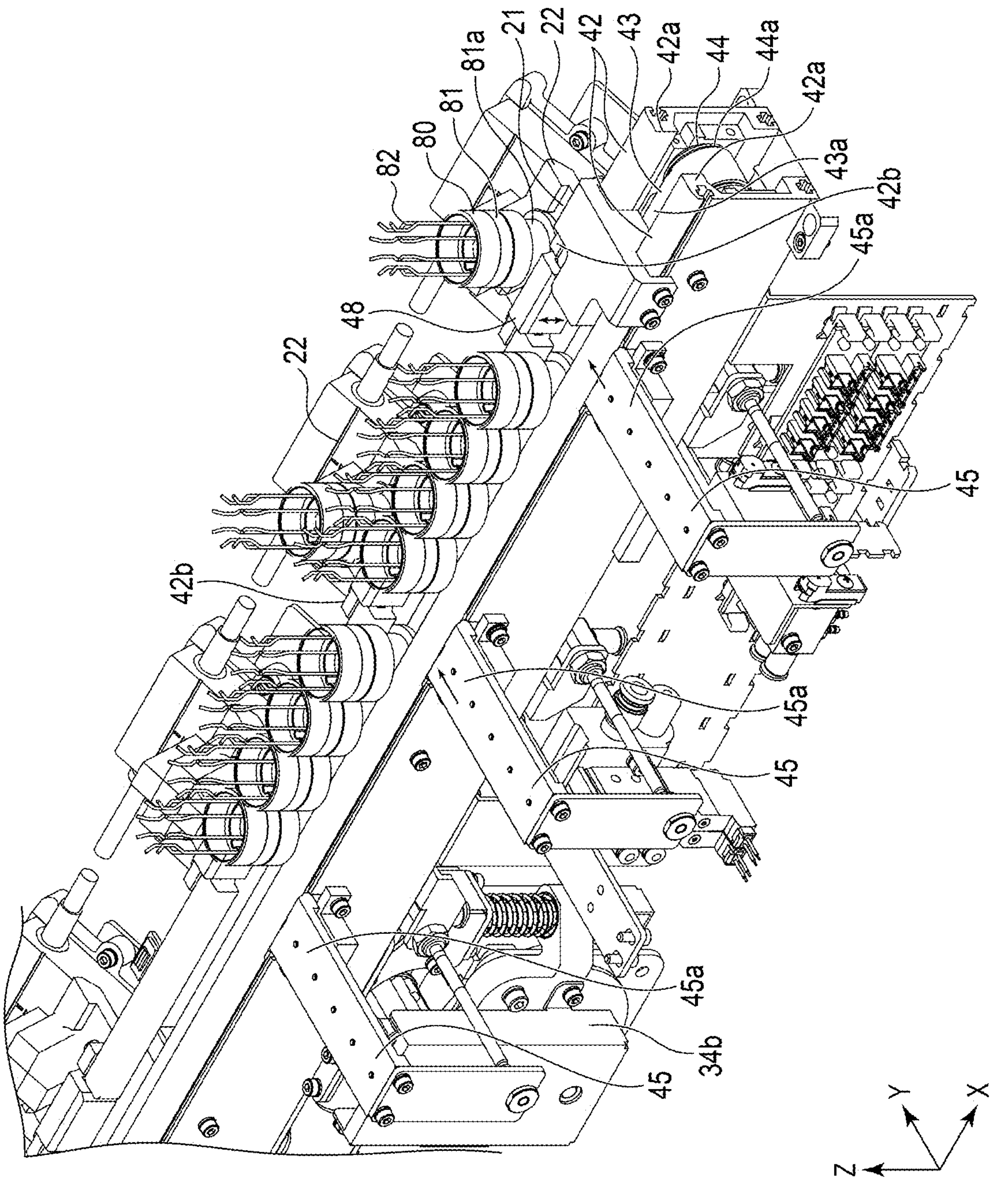
FIG. 6 is a perspective view showing a part of the sorting apparatus.
Figure 7:
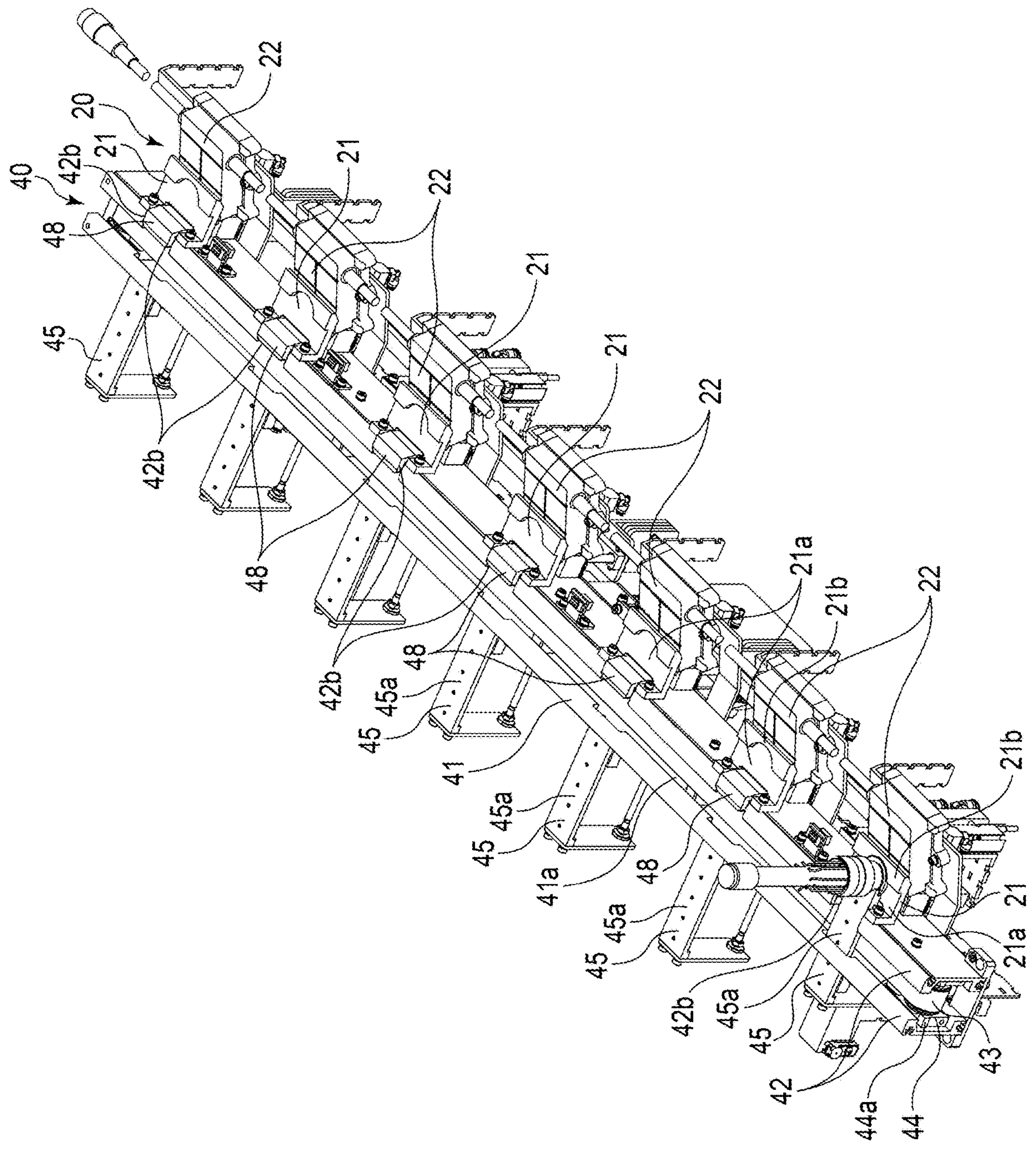
FIG. 7 is a perspective view showing a configuration of a feed conveyance unit of the sorting apparatus.
Figure 8:
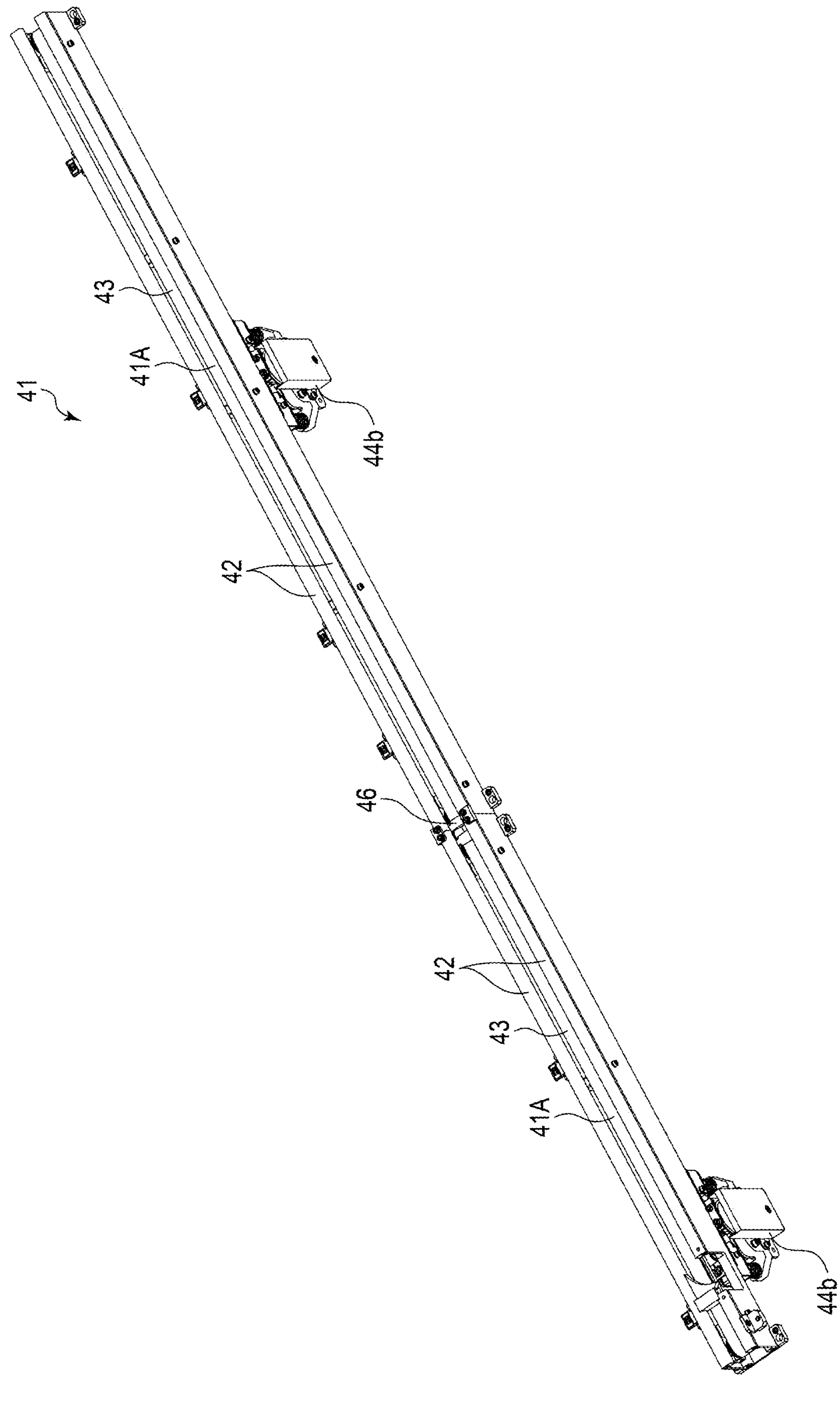
FIG. 8 is a perspective view showing a configuration of a feed conveyance unit of the sorting apparatus.
Figure 9:
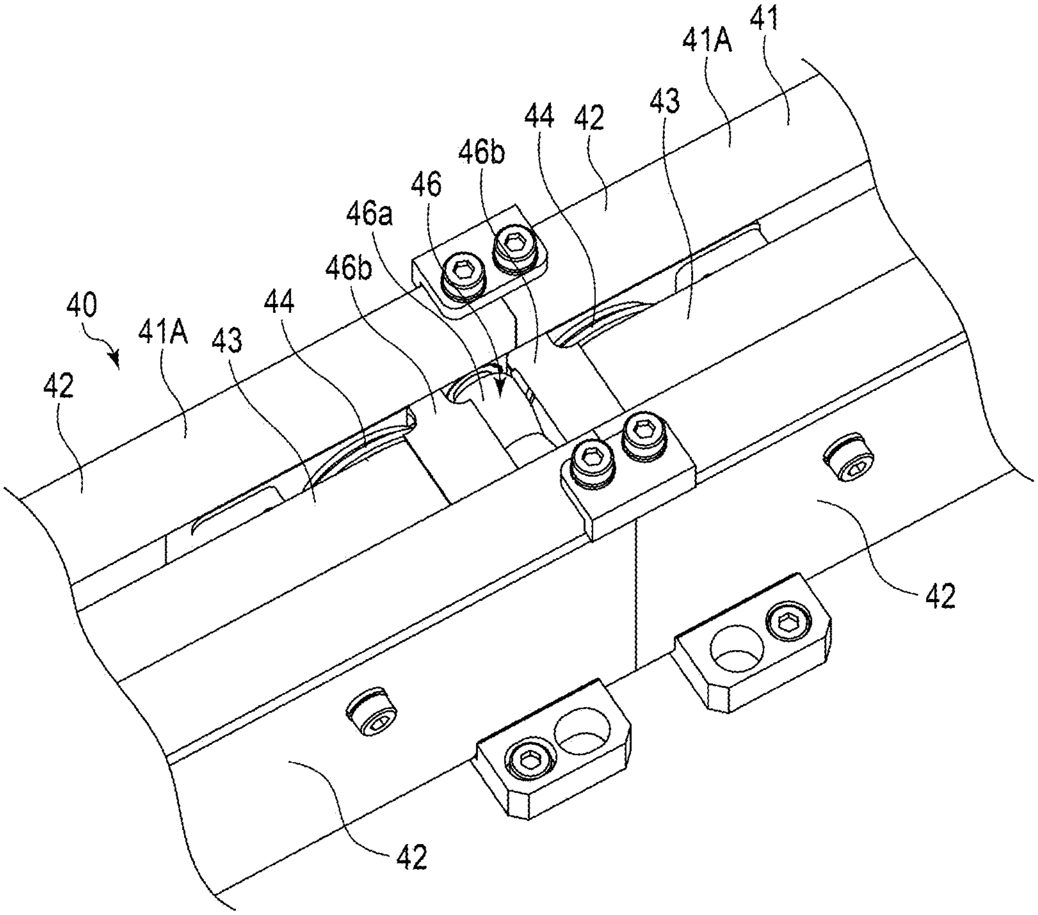
FIG. 9 is an enlarged perspective view showing a part of the feed conveyance unit of the sorting apparatus.
Figure 10:
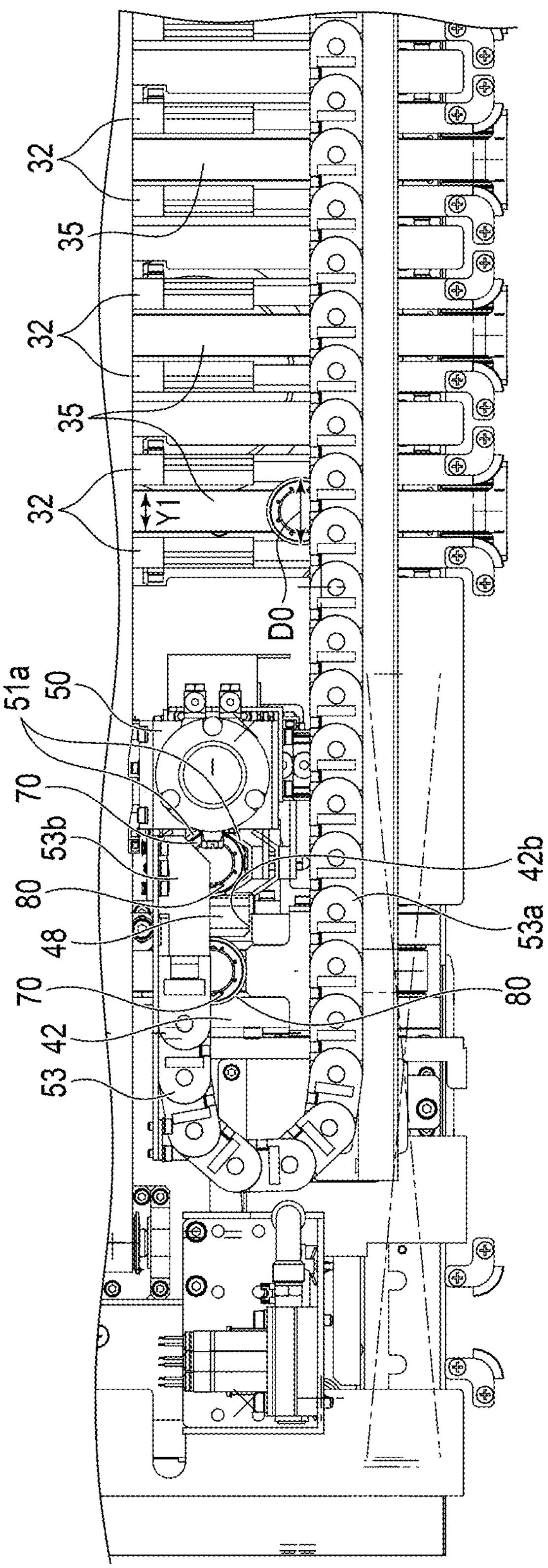
FIG. 10 is a plan view showing a part of the sorting apparatus.
Figure 11:
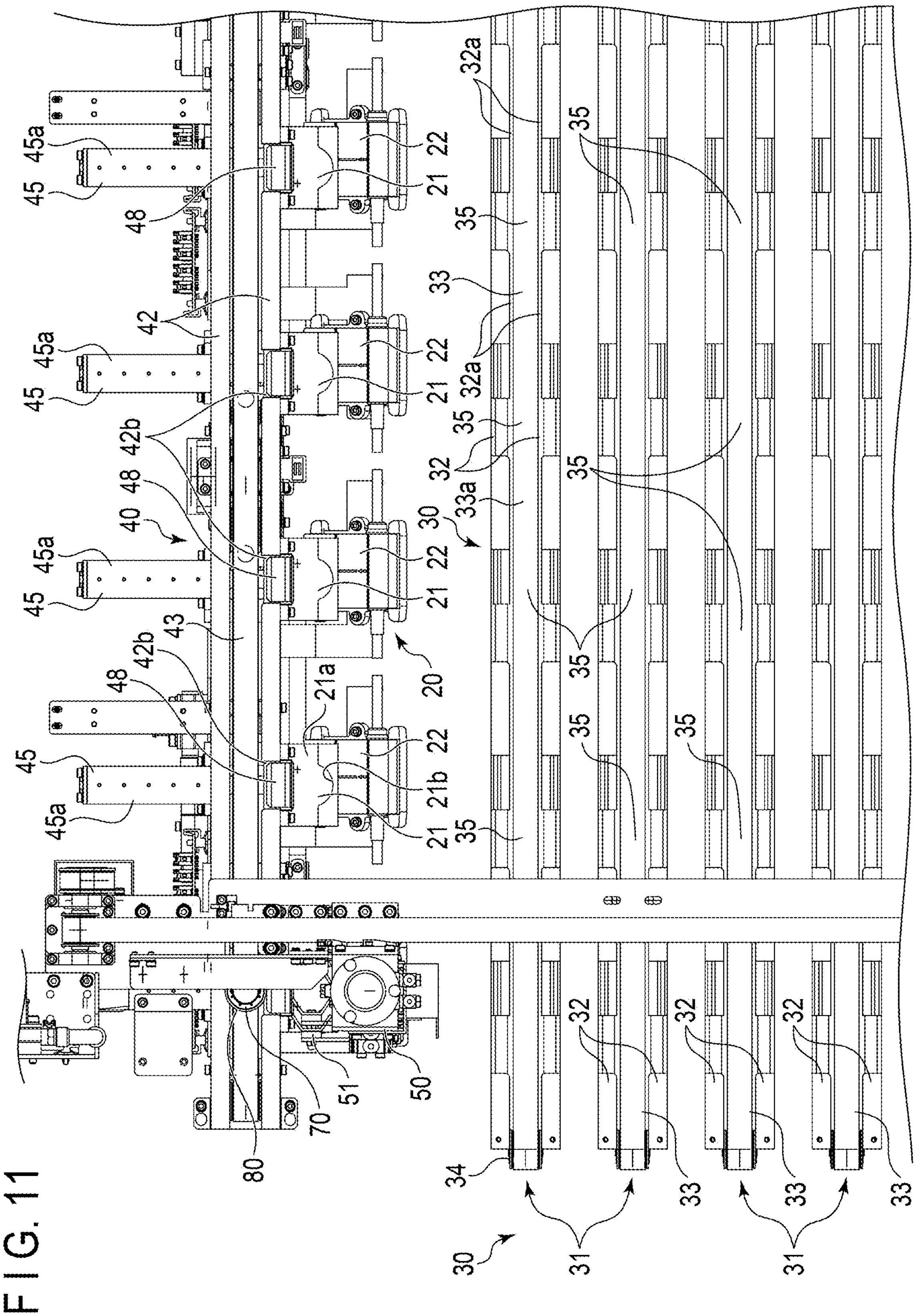
FIG. 11 is a plan view showing a part of the sorting apparatus.
Figure 12:
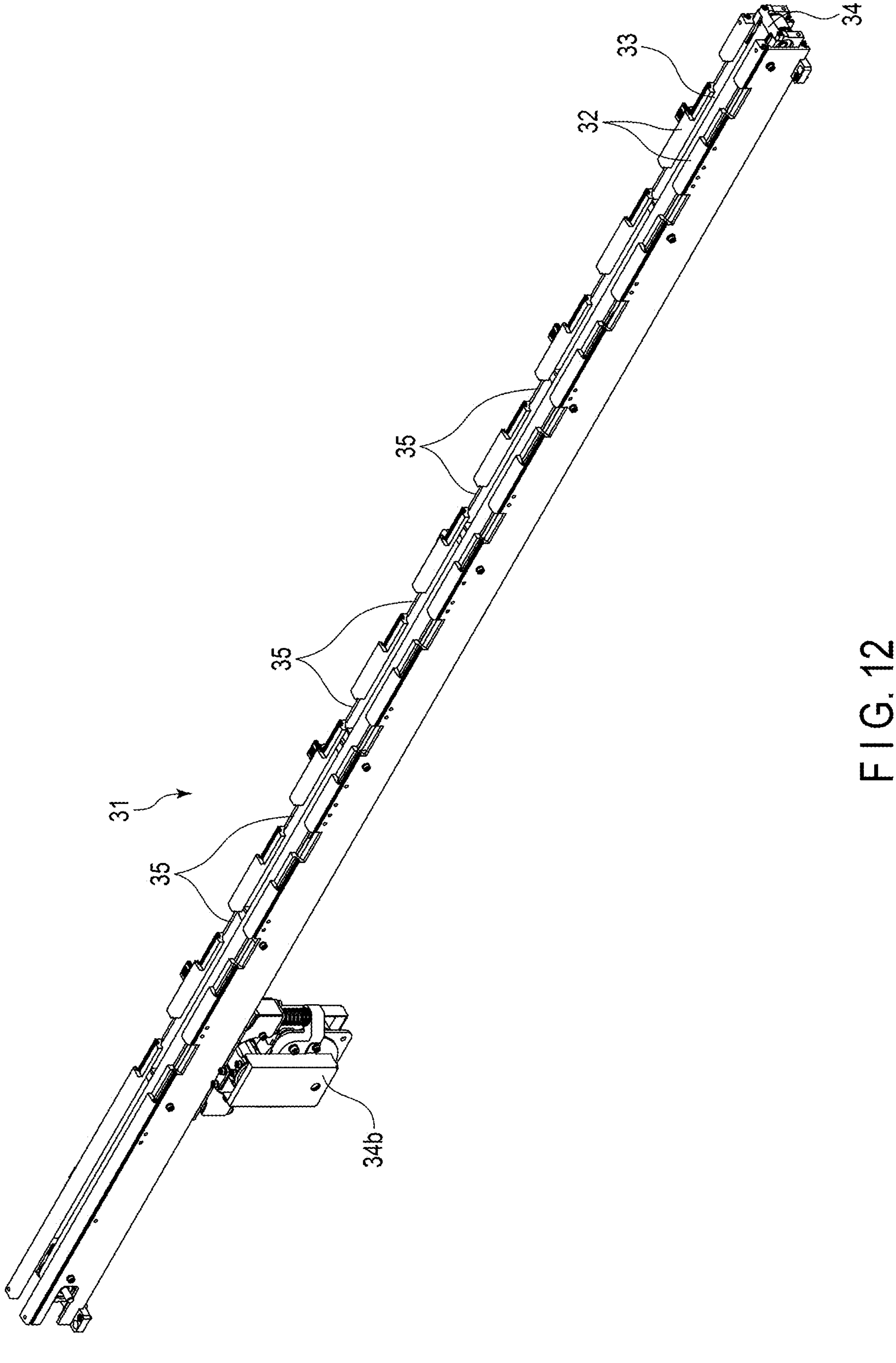
FIG. 12 is a perspective view showing a configuration of a sort conveyance unit of the sorting apparatus.
Figure 13:
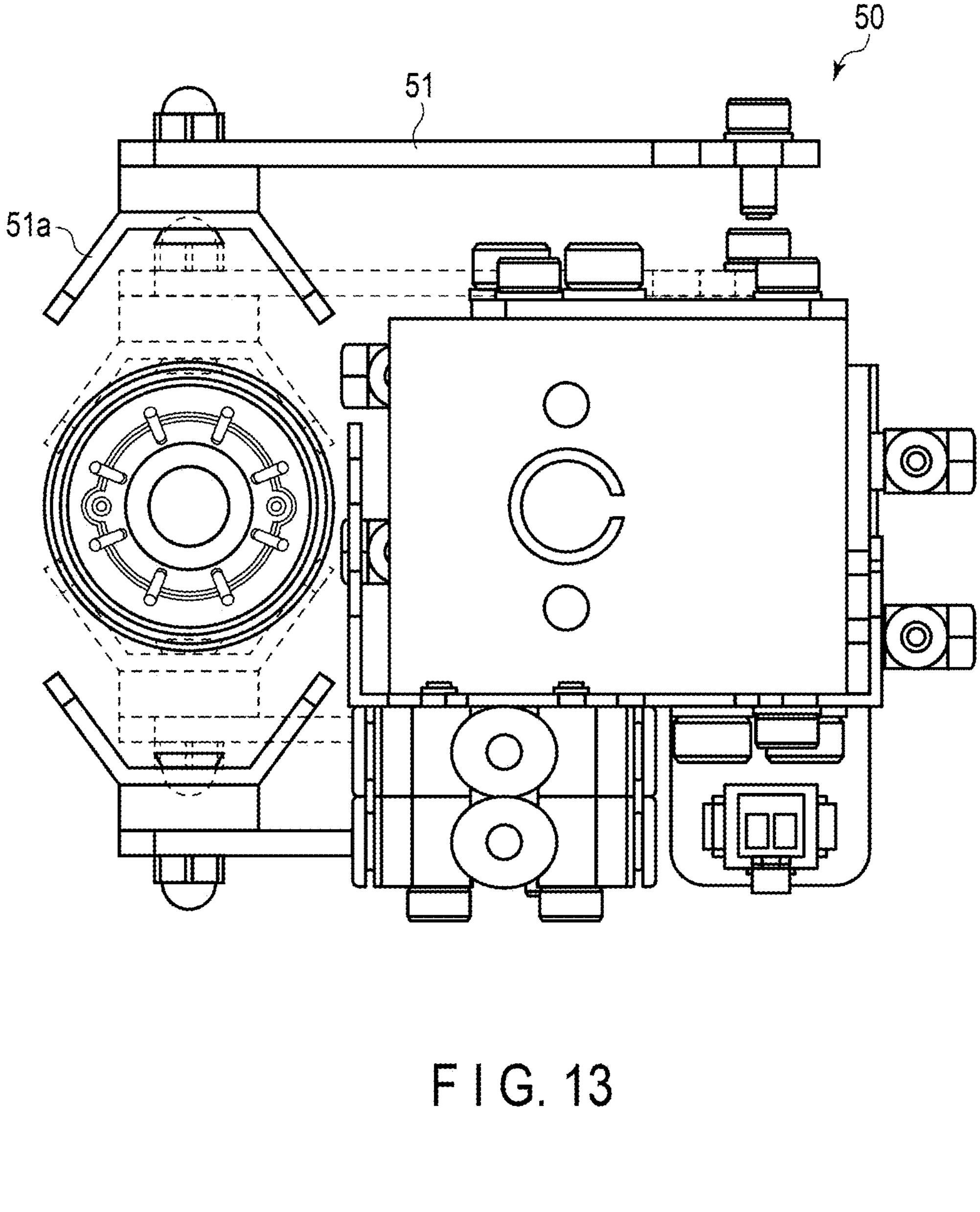
FIG. 13 is a plan view showing a chuck mechanism of the sorting apparatus.

Hereinafter, a sorting apparatus and a sorting method according to an embodiment of the present invention will be described with reference to FIG. 1 to FIG. 18. FIGS. 1 and 2 are perspective views of a sorting apparatus 1. FIG. 2 shows an internal configuration of a cover 95. FIGS. 3 and 4 are a front view and a side view of the sorting apparatus 1, respectively. FIGS. 5 and 6 are a side view and a perspective view of a part of the sorting apparatus 1, respectively. FIGS. 7 to 9 are perspective views showing a configuration of a feed conveyance unit 40. FIG. 10 is a plan view showing a part of the sorting apparatus 1. FIG. 11 is a plan view showing a part of the sorting apparatus 1. FIG. 12 is a perspective view showing a configuration of a sort conveyance unit of the sorting apparatus 1. FIG. 13 is a plan view showing a chuck mechanism of the sorting apparatus 1. FIGS. 14 to 18 are explanatory diagrams showing a sorting method. X, Y, and Z in the drawings represent three directions orthogonal to one another. In the example shown, an X axis corresponds to a conveyance direction through a conveyance pathway, a Y axis corresponds to a width direction of the conveyance pathway, and a Z axis corresponds to a vertical direction. In the drawings, components are enlarged, reduced, or omitted as needed for the purpose of explanation.

As shown in FIGS. 1 to 4, the sorting apparatus 1 includes a base 10, a holder station 20, a sort conveyance unit 30, a feed conveyance unit 40, a transfer unit 50, a control unit 60, and a cover 95. The sorting apparatus 1 is an apparatus that performs a sort process of a holder 80 holding a specimen container 70 containing a specimen under the control of the control unit 60. For example, in the sorting apparatus 1, a processing unit 90 including the holder station 20, the sort conveyance unit 30, the feed conveyance unit 40, and the transfer unit 50 is mounted on an upper portion of the base 10, and upper and side portions of the processing unit 90 are covered with the cover 95. As an example, the cover 95 has an opening 95*a* at a predetermined position continuous to a conveyance path of another processing apparatus.

As an example, the sorting apparatus 1 is arranged to be connected to a primary side, which is an upstream portion of a processing apparatus that performs various processes, such as an analysis process, and the sorting apparatus 1 performs a sort process as a pre-process of various processes. Specifically, the sorting apparatus is disposed so that end portions of a secondary side are continuously connected respectively to conveyance paths or a processing unit of another processing apparatus. For example, the conveyance paths set in an upper portion of the base 10 are connected to a subsequent conveyance mechanism having a configuration common to or compatible with that of the sorting apparatus 1. As a result, secondary sides of a plurality of sort conveyance paths 31*a* are continuous to different transport lanes for another process. For example, at an opening 95*a* configured in the cover 95, the specimen container 70 and the holder 80 are passed to a conveyance path of another processing apparatus connected to the sorting apparatus 1.

In the following description, as an example, the conveyance direction of each of the conveyance paths 31*a* and 41*a* in the sorting apparatus 1 extends in a first direction, the conveyance paths are arranged in parallel with one another (referred to as the parallel arrangement direction) along a second direction intersecting the first direction, and a height direction is a third direction intersecting the first direction and the second direction.

As shown in FIGS. 5 and 6, the specimen container 70 to be sorted is, for example, a blood collecting tube made of transparent glass or the like forming a tube shape. The specimen container 70 has a cylindrical shape having, inside thereof, a cylindrical space with an upper opening, and is configured to contain a specimen such as blood serum. A stopper 71 is fit in the upper opening. For example, a label is attached to an outer peripheral side surface of the specimen container 70 by a bond or adhesive. The label includes a bar code representing various kinds of information on the specimen, such as a name or a hospital ward to which the specimen belongs, various numbers, identification information, etc.

The holder 80 includes a holding cylinder 81 having a bottomed cylindrical shape, and a plurality of holding pins 82 extending upward from the holding cylinder 81. The holding cylinder 81 has a step 81*a*, such as an annular engagement groove on its outer peripheral surface. The step 81*a* is engaged with a projection 32*a* or 42*a* formed in an inner wall of a guide rail 32 or 42 of each conveyance unit 30 or 40. As a result, the holder 80 is guided so that the conveyance direction and position thereof conform to the guide rail 32 or 42. The holding pin 82 is, for example, a metal pin member, and is bent so that a part thereof protrudes radially inward toward the holder 80. The holding pin 82 is elastically deformable. The holder 80 holds the specimen container 70 inserted in the holding cylinder 81 with bending portions of the holding pins 82 pressing the outer peripheral surface of the specimen container 70. The holder 80 holding the specimen container 70 is engaged between a pair of guide rails 32 or 42, supported in an upright state, and conveyed as a conveyor belt 33 or 43 moves.

The holder 80 incorporates an RFID tag having specific number information tied to a specimen ID. For example, with regard to the holder 80 to be processed by the sorting apparatus 1, the specimen ID and the information of the RFID tag in the holder 80 are tied in advance.

As shown in FIGS. 1 to 4, the base 10 is a support base that supports, on its upper portion 11, the holder station 20, the sort conveyance unit 30, the feed conveyance unit 40, and the transfer unit 50. For example, the base 10 is configured to have a height of the upper surface and a shape of a side surface so that the sort conveyance paths 31*a* of the sort conveyance unit 30 are continuous to conveyance paths of another processing apparatus. For example, both end surfaces 12 of the base 10 in the first direction, which is a conveyance direction of the sort conveyance unit 30 or the like, form a flat plane aligned with ends of the sort conveyance paths 31*a* of the sort conveyance unit 30, so that the base 10 can be disposed in proximity to or in contact with a side surface of an adjacent processing apparatus that faces the corresponding end surface. For example, the base 10 is disposed in proximity to or in contact with the adjacent processing apparatus in such a manner that the distance between the end of the sort conveyance path 31*a* of a conveyor mechanism 31 on the base 10 and a conveyance path of the adjacent processing apparatus is smaller than an outer diameter or a width DO of the holder 80, so that the holder 80 can be transferred to and received from the adjacent processing apparatus.

The base 10 may further include the control unit 60, various display units, and an operation unit. For example, a display unit is a display device, such as a display configured to display an image or information of determination results. The operation unit is an input device for a power supply and various operation buttons.

As shown in FIGS. 1 to 7, the holder station 20 includes a plurality of holder stages 21 (holder supports) and a plurality of sensors 22 serving as a detection unit. The holder stages 21 are provided, for example, in ten places at regular intervals along the first direction. Each holder stage 21 includes a plate portion 21*a* constituting a support surface at the same height as the feed conveyance path 41*a* of the feed conveyance unit 40 to be described later, and a guide wall portion 21*b* formed of an end edge of the plate portion 21*a* protruding upward. For example, the guide wall portion 21*b* is a wall for preventing the holder 80 from falling when the holder 80 is slid, and has a curved surface along the shape of a side surface of the holder 80. The guide wall portion 21*b* is set to a level lower than the height at which the holder 80 is moved up in a transfer process. For example, an upper end face of the guide wall portion 21*b* is set to the same position as a lower end of the step 81*a*, such as the engagement groove. The height of the wall portion 21*b* is set to about several millimeters.

The sensor 22 is provided obliquely below each holder stage 21 and detects information of the specimen container 70 on the holder stage 21. For example, the sensor 22 is a sensor configured to read information such as an RFID tag incorporated within the holder 80. The sensor 22 is operated under the control of the control unit 60, and reads the information of the RFID tag incorporated in the holder 80 on the holder stage 21 at a predetermined timing. As the sensor 22, a camera having an image sensor or another type of bar code reader may be used in place of or in addition to the sensor that reads a tag.

The sort conveyance unit 30 shown in FIGS. 1 to 5 and 10 to 13 includes a plurality of conveyor mechanisms 31. Each conveyor mechanism 31 constitutes a sort conveyance path 31*a* extending in the first direction, and conveys the specimen container 70 along the sort conveyance path 31*a*.

The conveyor mechanism 31 includes the pair of guide rails 32, the conveyor belt 33 provided between the guide rails 32, and a belt feed mechanism 34.

The conveyor belt 33 extends between the guide rails 32 over the entire length of the guide rails in the first direction. For example, the conveyor belt 33 is looped, forms on the front surface thereof a load surface on which the holder 80 is loaded, and travels in a predetermined direction by means of a conveyance roller 34*a* arranged on the back surface thereof. That is, the conveyor belt 33 supports the bottom surface of the holder 80.

The paired guide rails 32 are disposed at a predetermined width along the conveyance pathway extending in the X axis direction in the drawings. A rail projection 32*a* to be engaged with the groove on the outer surface of the holder is formed on each guide rail 32. The paired guide rails 32 are arranged sideways with respect to the holder 80 to prevent the holder 80 from falling or dropping, and guide the holder 80 along the conveyance direction. For example, a distance Y1 between the rail projections 32*a* of the paired facing members is smaller than a width DO of the holder 80 and slightly greater than a width D1 of the step 81*a* which is the engagement groove.

The height of the paired guide rails 32 is set, for example, to be lower than the height of the holding cylinder 81 of the holder 80. As an example, the rail projections 32*a* protruding inward are formed at upper end portions of the respective guide rails 32, and are engaged with the step 81*a* which is an annular engagement groove formed on the outer peripheral surface of the holding cylinder 81. That is, the guide rail 32 is configured at a height equivalent to that of the step 81*a*.

In addition, the paired guide rails 32 are partially cut in a plurality of places to provide insertion portions 35 in which the space above the conveyor belt 33 has an extended width. For example, in the insertion portion 35, both sides of the guide rails above the conveyor belt 33 are opened to form a space having a width greater than the diameter of the holder 80 or a maximum width DO of the holder 80. Thus, the insertion portion 35 is configured to allow the holder 80 to be inserted therethrough from above. For example, the insertion portions 35 are formed in ten places respectively aligned with the holder stages 21 in each sort conveyance path 31*a*.

The belt feed mechanism 34 includes a conveyance roller 34*a* and a drive source 34*b* such as a motor, which rotates the conveyance roller 34*a*. The belt feed mechanism 34 rotationally drives the conveyance roller 34*a* on the back side of the conveyor belt 33 by means of the drive source 34*b* such as a motor, and moves the conveyor belt 33 in a predetermined feed direction.

The sort conveyance unit 30 conveys the holder 80 holding the specimen container 70 via feed motion of the conveyor belt 33 in each conveyor mechanism 31. At this time, the projections 32*a* of the guide rails 32 are engaged with the step 81*a* of the holder 80, thereby restricting the conveyance direction and position of the holder 80.

The holder 80 holding the specimen container 70 is supported in an upright state between the pair of guide rails 32, and is conveyed as the conveyor belt 33 moves.

The feed conveyance unit 40 shown in FIGS. 1 to 9 is disposed in one end side in the second direction in an upper portion of the base 10. The feed conveyance unit 40 is disposed in, for example, one end side of the holder station 20. The feed conveyance unit 40 includes a conveyor mechanism 41 and a pushing portion 45 (a movement portion).

The conveyor mechanism 41 constitutes a feed conveyance path 41*a* extending in the first direction, and conveys the specimen container 70 along the feed conveyance path 41*a*. The conveyor mechanism 41 includes the pair of guide rails 42, the conveyor belt 43 provided between the guide rails 42, and a belt feed mechanism 44.

The conveyor mechanism 41 conveys the holder 80 holding the specimen container 70 via a feed motion of the conveyor belt 43. At this time, the projections 42*a* of the guide rails 42 are engaged with the step 81*a* of the holder 80, thereby restricting the conveyance direction and position of the holder 80.

The paired guide rails 42 are disposed at a predetermined width along the conveyance pathway extending in the X axis direction in the drawings. The paired guide rails 42 are arranged on both sides of a series of holders on the conveyor belt 43. The rail projection 42*a* to be engaged with the groove on the outer surface of the holder is formed on each guide rail 42. For example, a distance Y1 between the rail projections 42*a* of the paired facing members is smaller than a maximum width DO of the holder 80.

The height of the paired guide rails 42 is set, for example, to be lower than the height of the holding cylinder 81 of the holder 80. As an example, the rail projections 42*a* protruding inward are formed at upper end portions of the respective guide rails 42, and are engaged with the step 81*a*, which is an annular engagement groove formed on the outer peripheral surface of the holding cylinder 81. That is, the guide rail 42 is configured at a height equivalent to that of the step 81*a*.

One of the paired guide rails 42 includes passage portions 42*b* which allow passage of the holder 80 in the second direction in a plurality of places connected to the holder stages 21. The paired guide rails 42 have a configuration in which a plurality of portions of wall members corresponding to the holder stages 21 of the adjacent holder station 20 can be retracted. Specifically, a plurality of portions of the guide rails 42 are cut to form the passage portions 42*b*, and each passage portion 42*b* is configured to be opened and closed by a movable wall portion 48 that moves up and down.

For example, the movable wall portion 48 can be switched between a first state for guiding the position of the holder and a second state of being retracted downward to allow the holder to move in the second direction. For example, the movable wall portion 48 is a liftable wall which can move up and down.

The conveyor belt 43 extends between the guide rails 42 over the entire length of the guide rails in the first direction. For example, the conveyor belt 43 is looped, forms on the front surface thereof a load surface on which the holder 80 is loaded, and travels in a predetermined direction by means of a conveyance roller 44*a* arranged on the back surface thereof.

The belt feed mechanism 44 includes a conveyance roller 44*a* and a drive source 44*b* such as a motor, which rotates the conveyance roller 44*a*. The belt feed mechanism 44 rotationally drives the conveyance roller 44*a* on the back side of the conveyor belt 43 by means of the drive source 44*b* such as a motor, and moves the conveyor belt 43 in a predetermined feed direction.

As shown in FIG. 8, a plurality of conveyance units 41A, each including a pair of guide rails 42, a conveyor belt 43, and a belt feed mechanism 44, may be connected in series. In this case, for example, a joint unit 46 including a roller member 46*a* and a plate member 46*b* may be provided between the conveyance units 41A to smoothly transfer the holder 80 between conveyor belts 43. Specifically, the roller member 46*a* and the plate member 46*b* are disposed in a gap between the conveyor belts 43, each being configured to perform feed motion, to extend the support surface. As a result, the gap between the conveyor belts 43 can be smaller than the length of the bottom surface of the holder 80 in the conveyance direction. Accordingly, the holder 80 can be stably transferred between the conveyor belts 43 of the paired conveyance units 41A by the feed motion of the conveyor belt 43 so as not to tilt or drop the holder 80.

The pushing portion 45 includes a pushing arm 45*a* configured to push sideways the holder 80 located at a feed position P0 of a side portion of the movable wall portion 48 in the feed conveyance path 41*a*, to move the holder 80 from the feed conveyance path 41*a* to a detection position P1 on the holder stage 21.

Thus, in the conveyor mechanism 41, the holder 80 can be moved through the passage portion 42*b* in the parallel arrangement direction, and the holder 80 located at the corresponding position in the passage portion 42*b* can be pushed sideways by the pushing portion 45 onto the holder stage 21 beside the passage portion 42*b*.

The transfer unit 50 shown in FIGS. 5 and 10 to 18 is provided with a plurality of transfer arms 51 each including an openable/closable chuck portion 51*a*, an up/down cylinder 52 configured to move up and down the transfer arm 51, a conveyor mechanism 53 configured to move the transfer arm 51 in the second direction, and a rotation mechanism 54 configured to rotate the transfer arm 51.

The transfer unit 50 repeatedly performs a series of operations of linear movements in the second and third directions, a rotational movement around a predetermined axis, and opening/closing operations, for holding, moving up, rotating, and moving down the holder 80 located at the detection position P1, and sequentially moving the holders 80 to carry-in positions P2 at predetermined transfer destinations.

The transfer arms 51 each include a chuck portion 51*a* having a plurality of opening/closing claws that can hold a holder 80 by opening and closing operations, and a drive mechanism 51*b*, such as a cylinder, configured to open and close the chuck portion 51*a*.

The up/down cylinder 52 is an air cylinder having a shaft portion connected to an upper portion of the transfer arm 51, and a cylinder portion configured to reciprocate the shaft portion in an axial direction along the third direction. The up/down cylinder 52 moves up or down the transfer arm 51 connected to the shaft portion at a predetermined timing.

The conveyor mechanism 53 is an electrically operated belt conveyor mechanism including a feed member 53*a* having a chain member or a belt member arranged in the second direction, and a drive mechanism portion 53*b* including a motor or the like that moves the feed member 53*a*. The conveyor mechanism 53 reciprocates the feed member 53*a* in the Y direction by a predetermined distance, for example, in a state in which a hand unit constituted by the transfer arm 51 and the up/down cylinder 52 is supported by the feed member 53*a*, which is, for example, belt-shaped, thereby reciprocating the holder 80 held by the transfer arm 51 in the Y direction.

The rotation mechanism 54 includes a rotation drive mechanism 54*a*, such as a rotation cylinder, configured to rotate the hand unit constituted by the transfer arm 51 and the up/down cylinder 52. The rotation mechanism 54 changes the direction of the transfer arm 51 by rotating the transfer arm 51 around the shaft center along the Z axis. For example, the rotation mechanism 54 changes the direction of the chuck portion 51*a* by 90 degrees so as to orient toward a direction in which the opening/closing claws approach and separate in the X direction when holding the holder 80 on the holder stage 21, and toward a direction in which the opening/closing claws approach and separate in the Y direction when releasing the holder 80 on the sort conveyance path 31*a* of each conveyor mechanism 31. Thus, when holding the holders 80, the chuck portion 51*a* accesses the holders 80 arranged along the X direction sideways in the Y direction on the feed conveyance path 41*a*, so that the holders 80 can be smoothly held simultaneously. On the other hand, when releasing the holders 80, since the chuck portion 51*a* releases the holders 80 to move downstream, it does not obstruct the conveyance of the holders 80.

The transfer unit 50 having the configurations described above holds the holders 80 that hold the specimen containers 70 and performs a transfer process to transfer the holders 80 to predetermined transfer destinations based on the specimen information, using a plurality of transfer arms 51, under the control of the control unit 60. For example, the transfer unit 50 repeats a cycle of holding, moving up, moving forward in the parallel arrangement direction, rotation, moving down, releasing, and moving backward. The transfer unit 50 repeats the processing of performing the cycle for each of the transfer destinations and returning to a standby stage.

The control unit 60 includes a processor for controlling the components of the apparatus based on various data, or calculation or determination results. Specifically, the control unit 60 performs a sort process by controlling conveyance operations of the conveyance units 30 and 40 and the mechanisms of the transfer unit 50.

For example, the control unit 60 controls the belt feed mechanism 44 of the feed conveyance unit 40 to drive or stop the feed conveyance path 41*a* at a predetermined timing.

The control unit 60 operates the movement portion of the holder station 20 at a predetermined timing and moves a holder from the feed conveyance path 41*a* of the conveyor mechanism 41 to the holder stage 21. For example, in a state where holders 80 to be sorted are located in the feed positions P0 provided in a plurality of places on the feed conveyance path 41*a*, the pushing arms 45*a* are operated to slide the holders 80 in the Y direction, thereby supplying the holders 80 to the detection positions P1 of the holder stages 21.

Furthermore, the control unit 60 drives the drive mechanism portions 51*b*, 52, 53*b*, and 54*a* of each transfer unit 50, so that the chuck portion 51*a* is closed to hold the holder 80 in the transfer arm 51, moving up the holder 80, moving it in the Y direction, rotating it to change the direction, moving it down, and opening the chuck portion 51*a*. In this manner, a sort process can be performed simultaneously in a plurality of transfer units 50. At this time, the conveyor mechanism 31, which is a conveyance destination, can be controlled by controlling the movement distance in the second direction. That is, to which of the conveyor mechanisms 31 each specimen container 70 should be transferred can be set based on the specimen information. Each sort conveyance path 31*a* is provided with a plurality of insertion portions 35 in positions respectively aligned with the holder stages 21 in the first direction. The specimen containers 70 are moved in the Y direction from the holder stages 21 to different positions corresponding to the respective holder stages 21. Therefore, even if the specimen containers 70 are transferred to the same sort conveyance path 31*a*, the transfer process of one specimen container does not obstruct the transfer process of another, since the specimen containers are transferred to different positions in the first direction. Accordingly, the movement operation can be simple and the specimen containers 70 can be smoothly transferred simultaneously, while the specimen containers 70 are held by the holders 80.

Furthermore, the control unit 60 controls the belt feed mechanisms 34 of the sort conveyance unit 30 to drive or stop the conveyor mechanisms 31 at predetermined timings.

Next, a sorting method using the sorting apparatus 1 according to the present embodiment will be described with reference to FIGS. 14 to 18.

The sorting method of the embodiment includes a feed conveyance process (ST1), a feed movement process (ST2), a detection process (ST3) for detecting information on the holder 80 or the specimen container 70 at the holder stage 21, a sort process (ST4) for transferring the holder 80 on the holder stage 21 to a conveyor mechanism 31 which is a sort destination, and a sort conveyance process (ST5) for conveying the holder 80 by the conveyor mechanism 31.

As the feed conveyance process (ST1), the holder 80 holding the specimen container 70 is conveyed by the conveyor mechanism 41. Specifically, the control unit 60 controls the belt feed mechanism 44 of the feed conveyance unit 40, and drives and stops the conveyor mechanism 41 at predetermined timings, so that the holders 80 are stopped at feed positions P0 adjacent to the holder stages 21 in the feed conveyance path 41*a* of the conveyor mechanism 41.

As the feed movement process (ST2), the control unit 60 moves the movement portion of the holder station 20 at a predetermined timing, so that the holders 80 at the feed positions P0 of the feed conveyance path 41*a* of the conveyor mechanism 41 can move from the feed conveyance path 41*a* to the detection positions P1 on the holder stages 21. Specifically, the movable wall portions 48 located at the feed positions P0 are moved down to be retracted, while the side portions of the holders 80 are simultaneously pushed in the Y direction by the arms 45. Accordingly, the holders 80 are slid to the adjacent holder stages 21.

As the detection process (ST3), the control unit 60 operates the sensor 22 to detect specimen information on the holders 80 or the specimen containers 70 held on the holder stages 21 in an upright state. As an example, the information on the specimen container 70 is detected by reading information of the RFID tag in the holder 80 tied to the specimen container 70. If a holder 80 that is not tied to an ID of a specimen container 70 flows through the conveyor, the holder 80 may be sorted as an empty holder 80 or an error holder 80. Information such as a bar code on the specimen container 70 may be detected instead of information on the holder 80.

As the sort process (ST4), the control unit 60 transfers each holder 80 holding a specimen container 70 to a predetermined transfer destination determined based on the information detected in ST3. Specifically, the control unit 60 drives the drive mechanism portions 51*b*, 52, 53*b*, and 54*a* of each transfer unit 50, so that the chuck portion 51*a* is closed to hold the holder 80 in the transfer arm 51, moving up the holder 80, moving it in the Y direction, rotating it to change the direction, moving it down, and opening the chuck portion 51*a*. In this manner, the sort process can be performed simultaneously in the plurality of transfer units 50. At this time, the holder 80 is moved to a desired conveyor mechanism 31 by controlling the movement distance in the second direction based on the specimen information of each specimen container 70. For example, the chuck portion 51*a* rotates and orients toward a direction in which the opening/closing claws approach and separate in the X direction when holding the holder 80 on the holder stage 21, and toward a direction in which the opening/closing claws approach and separate in the Y direction when releasing the holder 80 on the conveyor mechanism 31. Thus, when holding the holders 80, the chuck portion 51*a* accesses the holders 80 arranged in the X direction sideways in the Y direction on the feed conveyance path 41*a*, so that the holders 80 can be smoothly held at the same time. In addition, since the chuck portion 51*a* does not obstruct the conveyance of the holders 80 to the downstream side in the X direction, the processing efficiency can be improved.

Furthermore, since the insertion portions 35, through which the holders 80 can be inserted from above, are formed in a plurality of places respectively aligned with the holder stages 21 in each conveyor mechanism 31 of the sort conveyance unit 30, the holders 80 can be smoothly transferred to the sort conveyance path 31*a* of the desired conveyor mechanism 31 from above.

After the transfer process of the holders 80 is completed, the control unit 60 feeds the conveyor mechanism 31 as the sort conveyance process (ST5), thereby simultaneously conveying the transferred holders 80 to the respective conveyor mechanisms 31 to feed them to the downstream side. Accordingly, the specimen containers 70 respectively held in the holders 80 are fed to the processing apparatus or the analysis apparatus on the downstream side provided for the respective conveyor mechanisms 31.

The processing described above is performed simultaneously in parallel on the stages 21, to perform holding, moving up, moving forward, rotation, moving down, releasing, and moving backward for the specimen containers 70. As a result, the sort process can be performed simultaneously for a large number of specimen containers 70, so that the processing efficiency can be improved.

For example, the control unit 60 determines a transfer destination of each specimen container 70 from the specimen information, and transfers the specimen container 70 to the sort conveyance path 31*a* communicating with the desired transfer destination. At this time since the positions of the stages 21 are different in the second direction, the plurality of specimen containers 70 and the plurality of holders 80 can be placed on the same sort conveyance path 31*a* at the same time. Furthermore, when the transfer of the plurality of specimen containers 70 and the plurality of holders 80 has been completed, the sort conveyance paths 31*a* of the sort conveyance unit 30 are driven at the same rate. As a result, the holders 80 are simultaneously conveyed along the conveyance paths 31*a* parallel with one another, while the holders 80 do not collide with one another.

In the sorting apparatus 1 having the configuration described above, the specimen containers 70 are simultaneously transferred while being respectively held by the holders 80, so that a large number of specimen containers 70 can be sorted at a high rate in a small space.

In the sorting apparatus 1, the conveyor mechanisms 31 of the sort conveyance unit 30 extend along the X direction in the upper surface portion of the base 10, the holder stages 21 are arranged along the X direction beside the conveyor mechanisms 31, and the conveyor mechanism 41 of the feed conveyance unit 40 extends along the X direction beside the holder stages 21. Thus, a large number of sort conveyance paths 31*a* can be disposed in a small space and high-rate processing can be performed by a simple operation. Therefore, the sort process can be performed in the plurality of stages 21 in parallel.

The feed conveyance unit 40 is provided with the passage portions 42*b* formed by cutting the guide rails 42 at the respective feed positions P0. Accordingly, the holders can be smoothly moved from the feed conveyance unit 40 to the detection positions P1 of the holder stages 21.

Furthermore, the conveyor mechanism 31 is provided with the insertion portions 35 in which the distance between the rails 32 is wider and through which the holders 80 can be inserted at the respective carry-in positions P2. Accordingly, the holders 80 can be smoothly transferred to the respective sort conveyance paths 31*a*.

Moreover, since the holders 80 holding the specimen containers 70 are transferred, the movement in the vertical direction can be smaller as compared to a configuration in which, for example, a specimen container 70 is extracted from a holder 80 and transferred to another holder 80 that stands by in another position. Accordingly, space-saving can be achieved and handling can be easy, so that a large number of containers can be easily processed at a high rate.

Furthermore, the chuck portion 51*a* rotates and orients toward a direction in which the opening/closing claws approach and separate in the X direction when holding the holder 80 on the holder stage 21, and toward a direction in which the opening/closing claws approach and separate in the Y direction when releasing the holder 80 on the sort conveyance path 31*a*. Thus, when holding, the chuck portion 51*a* accesses the holders 80 arranged in the X direction sideways so that the holders 80 can be smoothly held. In addition, since the chuck portion 51*a* does not obstruct the conveyance of the holders 80 to the downstream side in the X direction, the processing efficiency can be improved.

The present invention is not limited to the embodiments described above and can be embodied in practice by modifying the structural elements without departing from the gist of each invention.

For example, the specimen containers 70 to be sorted may be of the same kind, or of different kinds. In the embodiment described above, for example, the information on the specimen container 70 and the information of the RFID of the holder 80 holding the specimen container 70 are tied, so that the information on the specimen container 70 is detected by reading the information on the corresponding holder 80. However, the embodiment is not limited to this example, but the information on the specimen container 70 may be directly read by the sensor 22.

In the embodiment described above, the arrangement of the components of the apparatus may be designed discretionarily.

The specimen containers 70 and the holders 80 loaded on the feed conveyance paths as an example of the transfer source are described as targets of transfer; however, the targets are not limited thereto. For example, containers held on another rack may be transferred.

Figure 14:
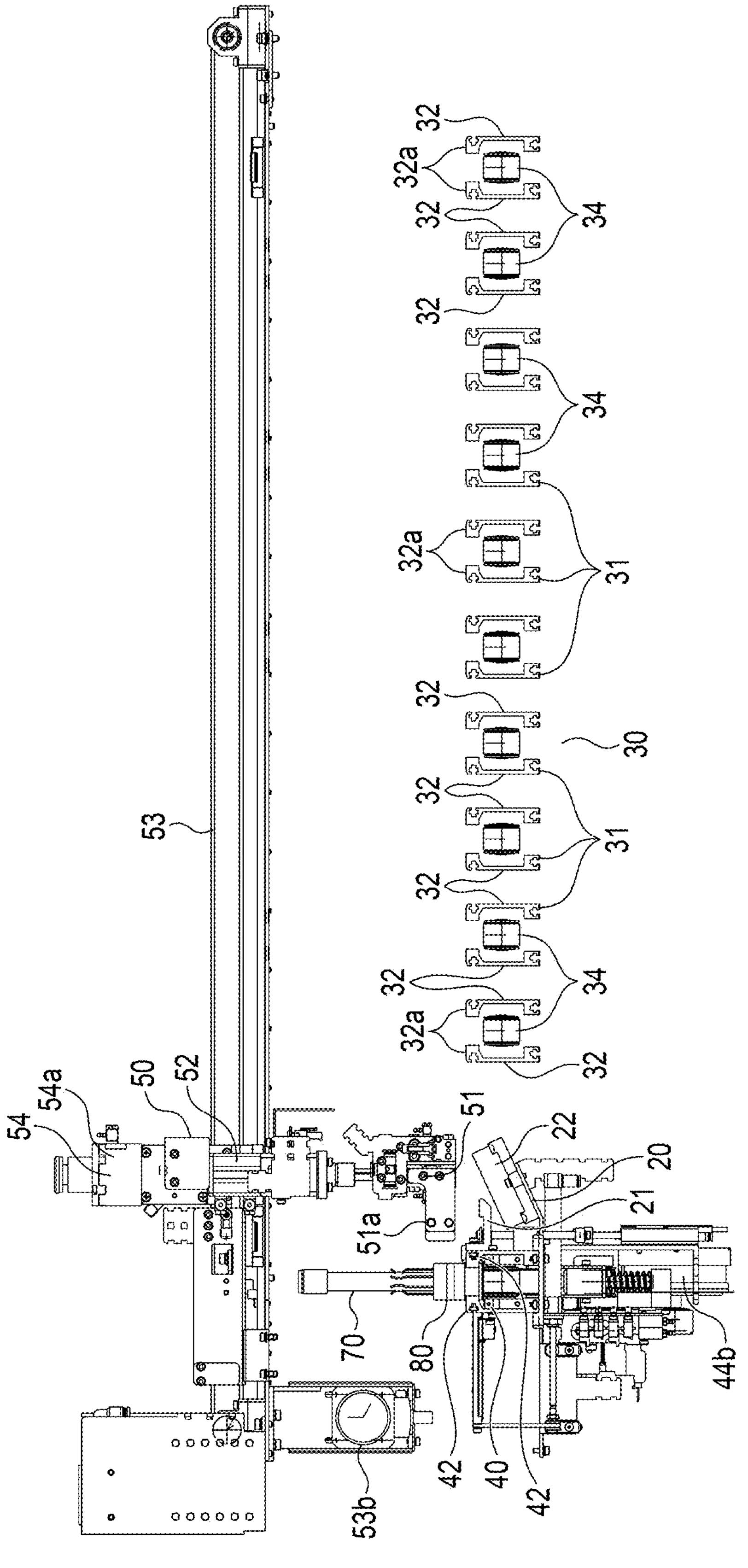
FIG. 14 is an explanatory view showing a sorting method according to the embodiment.
Figure 15:
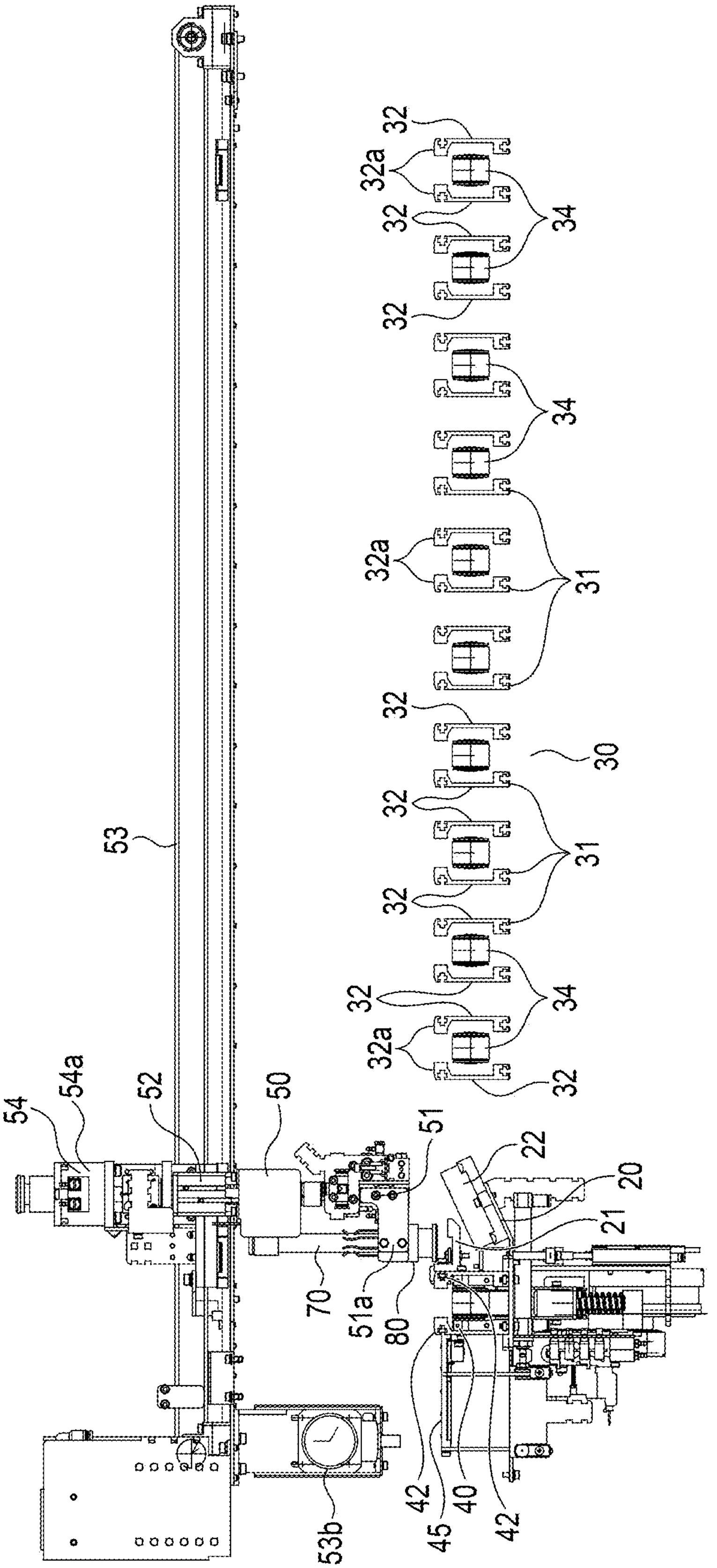
FIG. 15 is an explanatory view showing a sorting method according to the embodiment.
Figure 16:
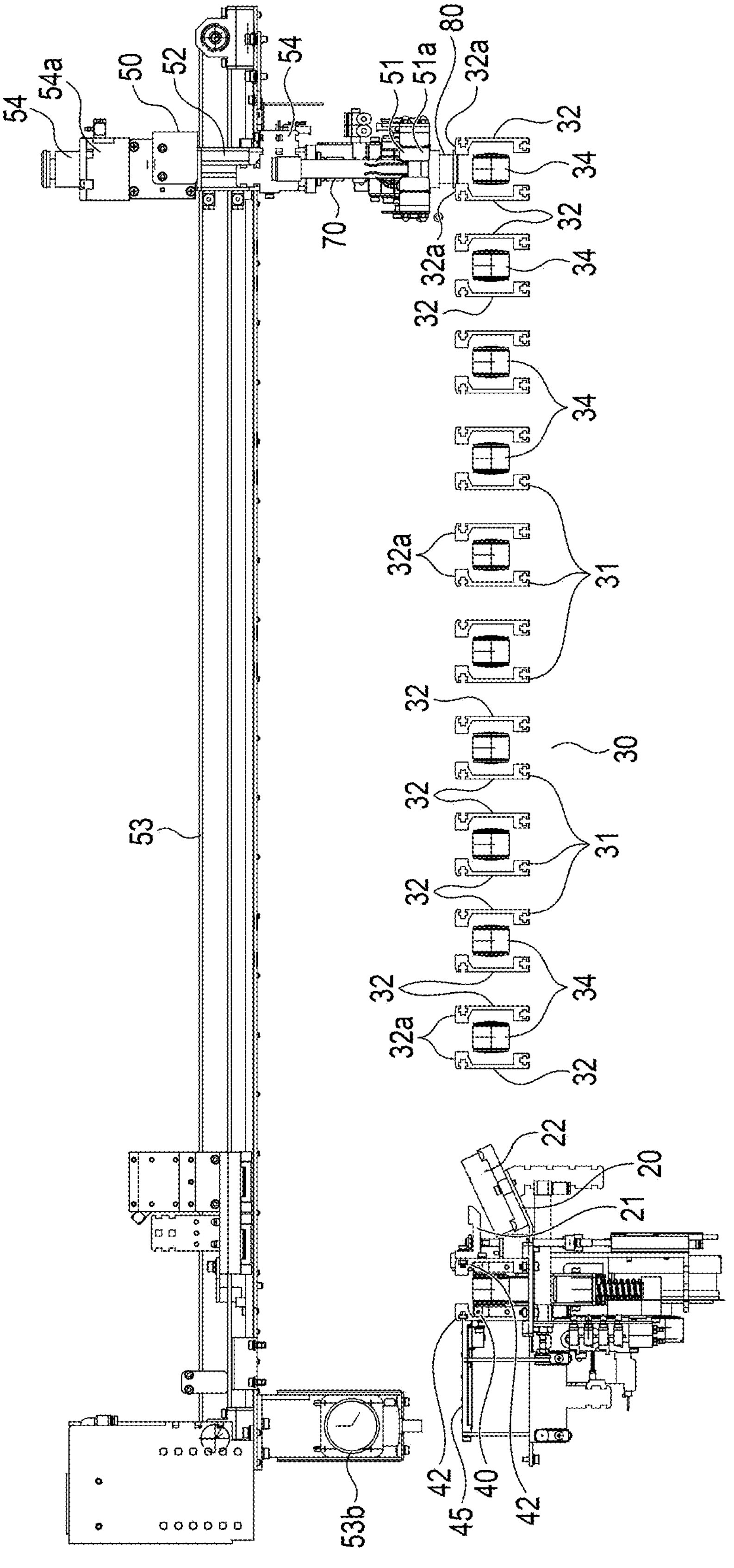
FIG. 16 is an explanatory view showing a sorting method according to the embodiment.
Figure 17:
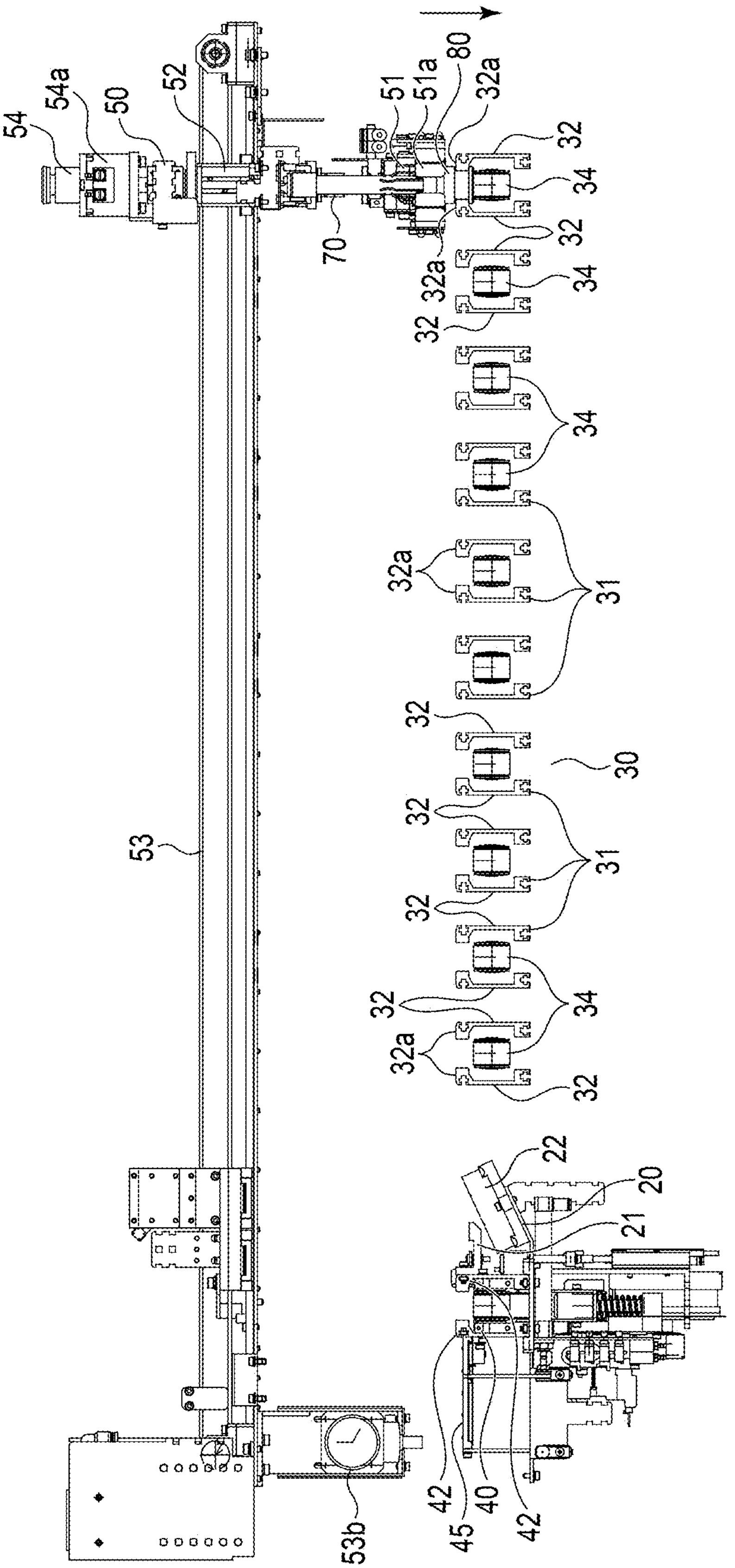
FIG. 17 is an explanatory view showing a sorting method according to the embodiment.
Figure 18:
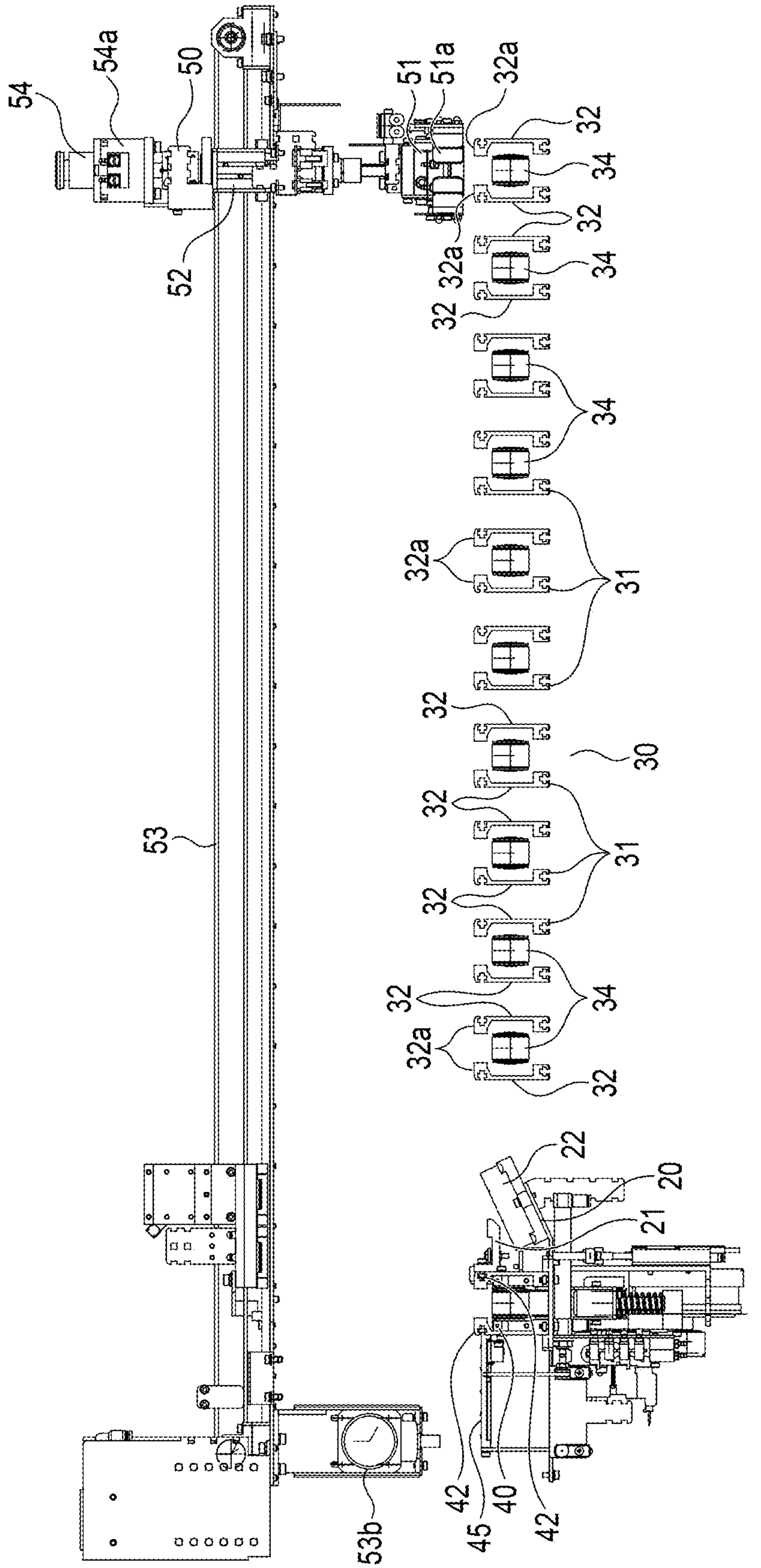
FIG. 18 is an explanatory view showing a sorting method according to the embodiment.
Figure 19:
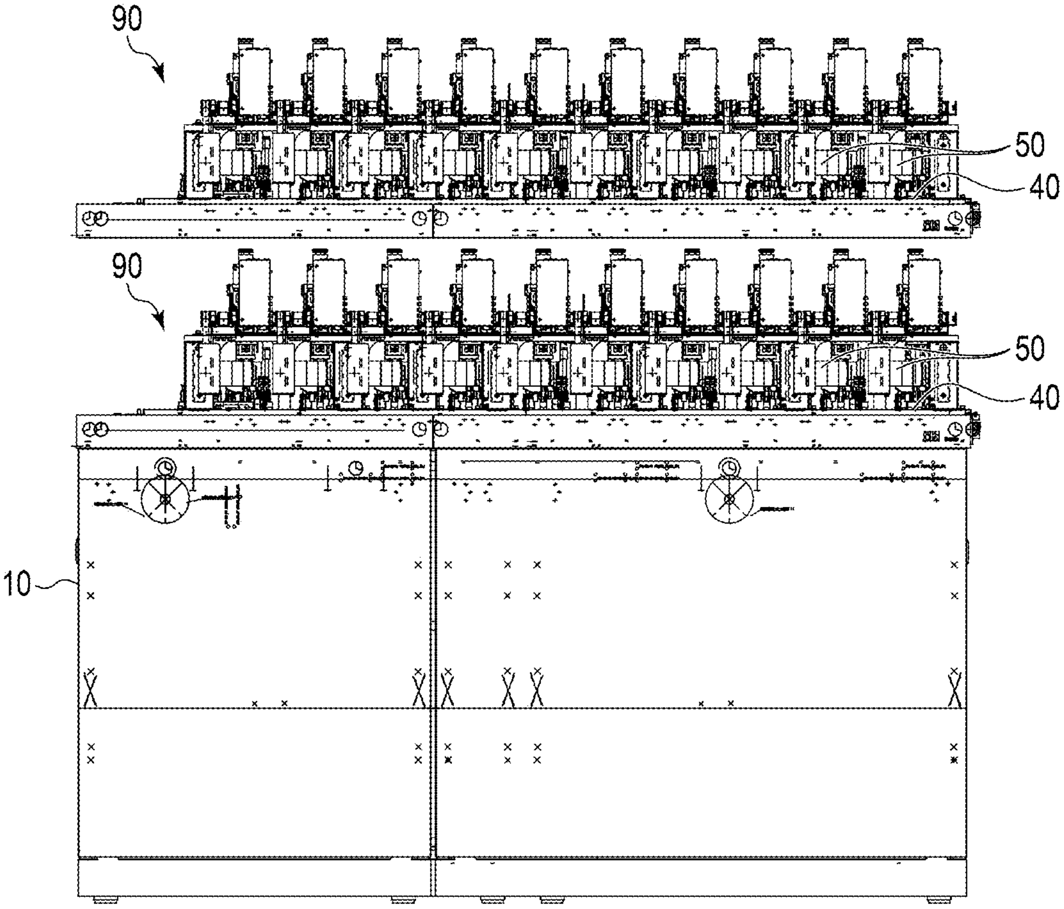
FIG. 19 is a side view of a sorting apparatus according to another embodiment of the present invention.

In the embodiments described above, one processing unit 90 including the holder station 20, the sort conveyance unit 30, the feed conveyance unit 40, and the transfer unit 50 on one stage in the upper portion of the base 10 is described as an example; however, the embodiment is not limited thereto. For example, as another embodiment, as shown in FIG. 14, a plurality of processing units 90 each including the holder station 20, the sort conveyance unit 30, the feed conveyance unit 40, and the transfer unit 50 may be arranged on a plurality of stages overlaid one above another in the vertical direction in the upper portion of the base 10. In this case, the number of specimen containers 70 to be processed can be increased in a small space, and a great number of specimen containers 70 can be sorted at a high rate.

The components described for the foregoing embodiments may be suitably omitted, or changes may be suitably made to the shapes, structures, materials, etc. of the components. Various inventions can be made by properly combining a plurality of structural elements disclosed in the above embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sorting apparatus comprising:

a holder station including a plurality of holders, each holder including a corresponding holding cylinder configured to hold a specimen container in an upright state;

a sort conveyance unit including a plurality of conveyor mechanisms including a plurality of respective sort conveyance paths configured to convey the holders in a first direction, each conveyor mechanism including a corresponding pair of guide rails, a corresponding conveyor belt between the pair of guide rails, and a belt feed mechanism to move the conveyor belt in a feed direction, and a height of the guide rails being lower than a height of the holding cylinder;

a feed conveyance unit including a feed conveyance path arranged on one side of and in the holder station and configured to convey the holders, each of the sort conveyance paths and the feed conveyance path extending in the first direction, and one of the sort conveyance paths and the feed conveyance path being in parallel with the other of the sort conveyance paths and the feed conveyance path along a second direction intersecting the first direction;

a transfer unit including a plurality of transfer arms, each transfer arm being configured to hold one of the holders and transfer the holder to any one of the sort conveyance paths; and a processor configured to control a transfer destination of the holder in the transfer unit.

2. The sorting apparatus according to claim 1, wherein the holder station is provided on one side of the sort conveyance unit, and the feed conveyance unit further includes a pusher configured to push out the holders on the feed conveyance path to a plurality of portions of the holder station, respectively.

3. The sorting apparatus according to claim 2, further comprising a base having an upper surface portion on which the holder station, the sort conveyance paths, and the feed conveyance path are disposed, wherein the sort conveyance paths and the feed conveyance path are arranged along the second direction intersecting the first direction in the upper surface portion of the base, and the holder station includes a plurality of holders support arranged along the first direction between the feed conveyance path and the sort conveyance paths.

4. The sorting apparatus according to claim 3, wherein processing units each including the holder station, the sort conveyance unit, and the transfer unit are arranged above the base in a plurality of stages one above another in a vertical direction.

5. The sorting apparatus according to claim 2, wherein the feed conveyance path includes a feed member on which the holders are loaded and guide rails arranged on both sides of a series of the holders, the holder supports have plate portions adjacent to a side of one of the guide rails of the feed conveyance path, and the one of the guide rails has passage portions in a plurality of places connected to the plate portions to allow passage of the holders in the second direction.

6. The sorting apparatus according to claim 2, wherein the sort conveyance paths each include a feed member on which the holders are loaded and guide rails arranged on both sides of a series of the holders, and the guide rails have insertion portions in a plurality of places along the first direction to allow insertion of the holders from above, and in the insertion portions, a space above the conveyor belt has an extended width, and in each insertion portion, a space having a width greater than a maximum width of the holder being configured to allow the holder to be inserted therethrough from above.

7. The sorting apparatus according to claim 1, further comprising sensors configured to detect information on the specimen container placed in the holder station, wherein the processor controls the transfer destination based on the information on the specimen container detected by the sensors.

8. The sorting apparatus according to claim 1, wherein each of the transfer arms includes a chuck portion configured to be openable and closable to hold and release the holder by opening and closing, the chuck portion of the transfer arm being configured to rotate in a transfer process to change directions in holding and releasing.

9. The sorting apparatus according to claim 1, wherein one of the holders in which the specimen container is held is transferred by the transfer unit from one of the plurality of sort conveyance paths to another of the plurality of sort conveyance paths.

10. A sorting method comprising:

detecting specimen information on a plurality of holders respectively disposed in a plurality of holder stages provided in a holder station to hold specimen containers in an upright state; and holding the holders on the holder stages using a plurality of transfer arms, and loading the holders on one sort conveyance path among a plurality of sort conveyance paths that is a transfer destination based on the specimen information, the sort conveyance paths being arranged in a plurality of rows beside the holder station, each holder among the plurality of holders including a corresponding holding cylinder to hold a specimen container in the upright state, a plurality of conveyor mechanisms including the plurality of respective sort conveyance paths being disposed to convey the holders in a first direction, each conveyor mechanism including a corresponding pair of guide rails, a corresponding conveyor belt between the pair of guide rails, and a belt feed mechanism to move the conveyor belt in a feed direction, a height of the guide rails being lower than a height of the holding cylinder, a feed conveyance path being disposed on one side of and in the holder station to convey the holders, each of the sort conveyance paths and the feed conveyance path extending in the first direction, and one of the feed conveyance path or the sort conveyance paths being in parallel with the other of the feed conveyance path or the sort conveyance paths, along a second direction intersecting the first direction.

11. The sorting method according to claim 10, further comprising transferring one of the holders in which the specimen container is held from one of the plurality of sort conveyance paths to another of the plurality of sort conveyance paths.

* * * * *